Patented Mar. 25, 1924.

1,487,880

UNITED STATES PATENT OFFICE.

STANLEY JOHN PEACHEY, OF DAVENPORT, STOCKPORT, ENGLAND.

PROCESS FOR THE VULCANIZATION OF CAOUTCHOUC.

No Drawing.    Application filed February 4, 1919.    Serial No. 275,012.

*To all whom it may concern:*

Be it known that I, STANLEY JOHN PEACHEY, a subject of the King of Great Britain and Ireland, and resident of Davenport, Stockport, England, have invented a Process for the Vulcanization of Caoutchouc, of which the following is a specification.

This invention relates to a process for effecting the vulcanization of rubber without the aid of heat, and consists in treating the rubber, preferably in the form of sheets or films, or in a dissolved or partially dissolved condition, alternately with sulphur dioxide and with hydrogen sulphide. The two gases diffuse into or dissolve in the rubber or its solution, and there interacting bring about a comparatively rapid vulcanization even at the ordinary atmospheric temperature.

It is known that sulphur dioxide and hydrogen sulphide interact in the presence of traces of moisture, with the production of a form of sulphur which is physically different from the form or forms which are commonly employed to bring about the vulcanization of rubber, but the employment of the interaction of these two gases in the rubber itself, or in its solution, as a means for bringing about vulcanization at the ordinary atmospheric temperature has not hitherto been proposed.

Whilst the ordinary forms of sulphur will only bring about vulcanization at an elevated temperature, the particular form of the element produced in the rubber by the interaction of sulphur dioxide and hydrogen sulphide appears to be capable, probably at the moment of its liberation (i. e., in the nascent state) of combining with the rubber at the ordinary atmospheric temperature and bringing about effective vulcanization. It is possible that an intermediate substance such as a thionic acid may first be formed and may play some part in the process, but in any case, the ultimate result is the sulphurization (vulcanization) of the rubber and this is the object of the present invention.

In carrying out the process, the rubber in the form of sheet for example, and either dry, i. e., in its normal state and containing the usual traces of moisture, or after wetting with a solvent such as benzene, is exposed to an atmosphere of (or containing) sulphur dioxide for a period of time which varies with the thickness of the sheet. It is then removed and transferred to an atmosphere of (or containing) hydrogen sulphide in which it is allowed to remain until, on removal, it no longer smells of sulphur dioxide. The alternate treatment with the two gases may be repeated, if necessary, until the desired degree of vulcanization is obtained. If desired, the rubber may first be treated with hydrogen sulphide, and then with sulphur dioxide, but the former method is to be preferred.

The process described above may be varied in several ways, as, for example, by exposing the rubber to an atmosphere of (or containing) sulphur dioxide, and subsequently immersing it in a solution of hydrogen sulphide in benzene or similar solvent, the operations being repeated, if necessary, until the desired degree of vulcanization is attained.

The sulphur dioxide and the hydrogen sulphide may be prepared by any of the ordinary methods and they do not require to be specially dried or purified.

The vulcanization of dissolved rubber by similar means is readily effected and affords a useful demonstration of the new process. A solution of rubber in a solvent, such as benzene, is saturated, or partly saturated, with sulphur dioxide which it readily takes up. The solution is then treated with gaseous hydrogen sulphide, or is mixed with a solution of rubber in benzene which has been saturated, or partly saturated, with hydrogen sulphide, or more simply, with a solution of hydrogen sulphide in benzene itself. Alternatively, a solution of rubber in benzene or like solvent is saturated, or partly saturated, with hydrogen sulphide and is then mixed with a solution of sulphur dioxide in a similar solvent. In a comparatively short time, even at the ordinary atmospheric temperature, the viscosity of the solution begins to increase and ultimately, pectization takes place and the liquid sets to a jelly, which is no longer soluble in benzene and which contains the rubber in a vulcanized condition. On allowing the solvent to evaporate, for example, by exposure to air at the ordinary atmospheric temperature, the vulcanized rubber is obtained in a normal form. The pectization of the solution is sometimes accompanied by segregation of a part of the solvent which can then be poured off, the remainder being removed by evaporation.

The solvent employed should be free from pyridine or other basic substance as the presence of such has the effect of retarding the vulcanization.

The following are given as examples of suitable quantities and concentrations of materials to employ in carrying out the process with dissolved rubber, but I do not bind myself to such quantities, or concentrations, as these may be varied without altering the nature of the process.

Example I: 100 grms. of a benzene solution containing 2.5% raw rubber is treated with sulphur dioxide until about 0.17 grm. of the latter has been taken up. A second quantity of 100 grms. of a similar rubber solution is treated with hydrogen sulphide until about 0.2 grms. of the latter have been taken up. The two solutions are then mixed, and after pectization has occurred, the solvent is removed by evaporation.

Example II: 100 grms. of an 8% solution of masticated rubber in benzene is treated with hydrogen sulphide until it has taken up about 0.28 grms. of the gas. The solution of sulphur dioxide in benzene is then mixed with 26.8 grms. of a 1% solution, after which the process is completed as in Example I.

Example III: 100 grms. of a 12% solution of masticated rubber in benzene is saturated with hydrogen sulphide and is then mixed with 40.2 grms. of a 1% solution of sulphur dioxide in solvent naphtha or benzene, the process being completed as in Examples I and II.

What I claim is:—

1. Vulcanizing rubber without the aid of heat by means of the interaction of sulphur dioxide and hydrogen sulphide in the mass, substantially as herein set forth.

2. Vulcanizing rubber without the aid of heat in the presence of a solvent by means of the interaction of sulphur dioxide and hydrogen sulphide, substantially as herein set forth.

3. Process for the vulcanization of rubber without the aid of heat by means of the interaction of the two gases, sulphur dioxide and hydrogen sulphide, in the mass, consisting in treating the rubber first with one of the two gases and then separately with the other gas until the desired degree of vulcanization is obtained.

4. Process for the vulcanization of rubber without the aid of heat in the presence of a solvent by treatment with the two gases, hydrogen sulphide and sulphur dioxide, consisting in treating first with one of the two gases and then separately with the other gas until the desired degree of vulcanization is obtained.

5. Process for vulcanizing rubber by treatment in the presence of a solvent with the two gases, sulphur dioxide and hydrogen sulphide, consisting in dissolving rubber in benzene or like solvent, dividing the solution into two parts, treating one part with one of the two gases and the other part with the other gas, and mixing the two parts.

6. Process for vulcanizing rubber by treatment in the presence of a solvent with the two gases, sulphur dioxide and hydrogen sulphide, in which two portions of benzine or like solvent, in one of which rubber is dissolved, are treated one with hydrogen sulphide and the other with sulphur dioxide, and are subsequently mixed.

7. Process for the vulcanization of rubber without the aid of heat by means of the interaction of the two gases, sulphur dioxide and hydrogen sulphide, in the mass, the two gases being allowed alternately to diffuse into the rubber and there to interact to produce vulcanization without the aid of heat.

8. Process for the vulcanization of rubber in solution by means of the interaction of the two gases, sulphur dioxide and hydrogen sulphide, in the solution, the two gases being allowed alternately to dissolve in the solution and there to interact to produce vulcanization of the dissolved rubber without the aid of heat.

9. Process for the vulcanization of rubber by means of the interaction of the two gases, sulphur dioxide and hydrogen sulphide, in the mass, consisting in exposing the rubber to one of the gases and subsequently treating with the other gas in presence of benzene or like solvent.

10. Process for the vulcanization of rubber by means of the interaction of the two gases, hydrogen sulphide and sulphur dioxide, wherein the rubber is in a dissolved state, the solution being treated alternately first with one of the gases and then with the other.

11. Vulcanized rubber produced by the interaction of sulphur dioxide and hydrogen sulphide in the mass, without the aid of heat as set forth.

12. A process for vulcanizing rubber, which comprises treating the rubber with $H_2S$ and $SO_2$ in a liquid medium in the presence of moisture.

13. A process for vulcanizing rubber, which comprises treating it with an organic liquid having the property of swelling the rubber, and treating it with $H_2S$ and $SO_2$ in the presence of moisture.

14. The process of vulcanizing rubber, which comprises treating it with a solution of $SO_2$ in an organic solvent adapted to swell the rubber, and then treating it with an excess of $H_2S$.

15. The process of vulcanizing rubber, which comprises immersing it in a solution of $SO_2$ in an organic solvent adapted to swell the rubber, then immersing it in another quantity of the same solvent containing $H_2S$, maintaining an excess of $H_2S$, and removing the rubber.

16. The process of vulcanizing rubber, which comprises immersing it in a solution of $SO_2$ in an organic solvent adapted to swell the rubber, transferring the rubber into a similar solvent containing $H_2S$, passing $H_2S$ through the solvent until an excess of $H_2S$ is present, removing the rubber, and evaporating the solvent.

In witness whereof I have hereunto set my hand in the presence of two witnesses.

STANLEY JOHN PEACHEY.

Witnesses:
HY. JUNCA,
FRED J. MEREDITH.